United States Patent  (10) Patent No.: US 8,599,496 B2
Ise et al.  (45) Date of Patent: *Dec. 3, 2013

(54) IMAGE PICKUP LENS FOR SOLID-STATE IMAGE PICKUP ELEMENT

(71) Applicant: Kantatsu Co., Ltd., Yaita (JP)

(72) Inventors: Yoshio Ise, Sukagawa (JP); Masaya Hashimoto, Sukagawa (JP)

(73) Assignee: Kantatsu Co., Ltd., Tochigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,208

(22) Filed: Jan. 24, 2013

(65) Prior Publication Data

US 2013/0135755 A1 May 30, 2013

Related U.S. Application Data

(63) Continuation of application No. 13/203,159, filed as application No. PCT/JP2010/055048 on Mar. 24, 2010.

(30) Foreign Application Priority Data

Mar. 31, 2009 (JP) ................................ 2009-084695

(51) Int. Cl.
  *G02B 13/18* (2006.01)
  *G02B 9/60* (2006.01)

(52) U.S. Cl.
  USPC .......................................... 359/714; 359/764

(58) Field of Classification Search
  USPC .......................................... 359/714, 763, 764
  See application file for complete search history.

(56) References Cited

U.S. PATENT DOCUMENTS

| 5,267,086 | A | 11/1993 | Hirano |
| 7,502,181 | B2 | 3/2009 | Shinohara |
| 8,179,615 | B1 | 5/2012 | Tang et al. |
| 8,233,224 | B2 | 7/2012 | Chen |
| 2007/0229984 | A1 | 10/2007 | Shinohara |
| 2011/0013069 | A1* | 1/2011 | Chen .............................. 348/335 |
| 2011/0249348 | A1 | 10/2011 | Kubota et al. |

FOREIGN PATENT DOCUMENTS

| JP | 3-138612 A | 6/1991 |
| JP | 2007-264180 A | 10/2007 |
| JP | 2007-298572 A | 11/2007 |
| WO | 2010/113717 A1 | 10/2010 |

OTHER PUBLICATIONS

International Search Report of PCT/JP2010/055048, mailing date Jun. 15, 2010.

* cited by examiner

*Primary Examiner* — Scott J Sugarman
(74) *Attorney, Agent, or Firm* — Westerman, Hattori, Daniels & Adrian, LLP

(57) ABSTRACT

An image pickup lens includes a first lens having a positive refractive power with a convex surface facing the object side, a second lens having a negative refractive power with a concave surface facing an image side, a third lens having a negative refractive power with both surfaces formed from aspheric surface, a fourth lens of a meniscus shape having a positive refractive power with a convex surface facing the image side, and a fifth lens of a meniscus shape having a negative refractive power with a concave surface facing the image side, wherein the curvature radius of the fourth lens satisfies conditional expression (13) below:

$$1.4 < r7/r8 < 3.0 \qquad (13)$$

where r7 is the curvature radius of the object-side surface of the fourth lens, and r8 is the curvature radius of the image-side surface of the fourth lens.

16 Claims, 12 Drawing Sheets

IMAGE PICKUP LENS FOR SOLID-STATE IMAGE PICKUP ELEMENT

CROSS REFERENCE TO RELATED APPLICATION

This application is a continuation of U.S. application Ser. No. 13/203,159, filed Aug. 24, 2011, which is a national phase of PCT application No. PCT/JP2010/055048, filed on Mar. 24, 2010, the contents of which are incorporated herein by reference.

The present application is based on and claims priority of Japanese patent application No. 2009-084695 filed on Mar. 31, 2009, the entire contents of which are hereby incorporated by reference.

BACKGROUND OF THE INVENTION

1. Field of the Invention

The present invention relates to an image pickup lens for a solid-state image pickup element that is used in a small-size image pickup device for mobile terminals, PDA (Personal Digital Assistant) devices, and other small-size, thin electronic devices.

2. Description of the Related Art

In recent years, the market for mobile terminals having an image pickup device has grown. Consequently, the image pickup device has begun to incorporate a small-size, high-pixel-number, solid-state image pickup element.

Corresponding to the downsizing and increase in the number of pixels of the imaging element, the image pickup lens is required to have increased performance in view of resolution and image quality, and with wide use thereof, the image pickup lens is also requested to reduce cost.

In order to satisfy a trend for increasing performance, the image pickup lens configured from a plurality of lenses is becoming popular. In comparison with the lens configuration of two to four lenses, the image pickup lens of a five-lens configuration which is capable of increasing performance than in the lens configuration of two to four lenses is also being proposed.

An image pickup lens disclosed, for instance, in JP-A No. 2007-264180 (Patent Document 1) exhibits high performance by including, in the order from an object side, a first lens, a second lens, a third lens, a fourth lens, and a fifth lens. The first lens has a convex surface on the object side and has a positive refractive power. The second lens has a concave surface facing an image side, has a negative refractive power, and has a meniscus shape. The third lens has a convex surface facing the image side, has a positive refractive power, and has a meniscus shape. The fourth lens has an aspherical surface on both sides, has a concave surface on the image side on an optical axis, and has a negative refractive power. The fifth lens has an aspherical surface on both sides and has a positive or negative refractive power.

Further, an image pickup lens disclosed, for instance, in JP-A No. 2007-298572 (Patent Document 2) exhibits high performance by including, in the order from an object side, an aperture stop, a first lens, a second lens, a third lens, a fourth lens, and a fifth lens. The first lens has a positive refractive power. The second lens is joined to the first lens and has a negative refractive power. The third lens has a concave surface facing the object side and has a meniscus shape. The fourth lens has a concave surface facing the object side and has a meniscus shape. The fifth lens has at least one aspherical surface, has a convex surface facing the object side, and has a meniscus shape.

The image pickup lenses described in the Patent Documents 1 and 2 each include five lenses to exhibit high performance. From the viewpoint of their optical length, however, they are not adequately designed to reduce their size and thickness.

SUMMARY OF THE INVENTION

The present invention has been made in view of the above circumstances and has an object to provide a small-size, low-cost, high-performance image pickup lens for a solid-state image pickup element.

The above-mentioned problem can be addressed when the image pickup lens for a solid-state image pickup element is configured as described below.

An image pickup lens according to aspect 1 of the present invention includes, in the order from an object side, a first lens, a second lens, a third lens, a fourth lens, and a fifth lens. The first lens has a convex surface facing the object side on an optical axis and has a positive refractive power. The second lens has a concave surface facing an image side on the optical axis and has a negative refractive power. The third lens has a negative refractive power and has aspheric surfaces on the object side and the image side. The fourth lens has a convex surface facing the image side on the optical axis, has a positive refractive power, and has a meniscus shape. The fifth lens has a concave surface facing the image side on the optical axis, has a negative refractive power, and has a meniscus shape. The curvature radius of the fourth lens satisfies conditional expression (13) below:

$$1.4 < r7/r8 < 3.0 \tag{13}$$

where r7 is the curvature radius of the object-side surface of the fourth lens, and r8 is the curvature radius of the image-side surface of the fourth lens.

The image pickup lens according to aspect 2 satisfies conditional expressions (1) and (2) below, which concern the Abbe number of a material used for the first lens and the second lens:

$$45 < v1 < 90 \tag{1}$$

$$22 < v2 < 35 \tag{2}$$

where v1 is the Abbe number for d-line of the first lens, and v2 is the Abbe number for d-line of the second lens.

Conditional expression (1) above defines the Abbe number of the first lens. If the value is below the lower limit of the conditional expression (1), the variance value difference from the second lens is decreased so that chromatic aberration correction is insufficient. If, on the contrary, the value exceeds the upper limit thereof, the balance between axial chromatic aberration and chromatic aberration of magnification is impaired so that performance deterioration occurs at the periphery of an image area.

Conditional expression (2) above defines the Abbe number of the second lens. If the value is below the lower limit of the conditional expression (2), the balance between axial chromatic aberration and off-axis chromatic aberration is impaired so that performance deterioration occurs at the periphery of the image area. If, on the contrary, the value exceeds the upper limit thereof, the variance value difference from the first lens is decreased so that chromatic aberration correction is insufficient.

The image pickup lens according to aspect 3 is configured so that the first lens, the second lens, the third lens, the fourth lens, and the fifth lens are so-called plastic lenses that have at least one aspherical surface and are made of a resin material.

Cost reduction can be achieved when the first lens, the second lens, the third lens, the fourth lens, and the fifth lens are made of an inexpensive resin material exhibiting high production efficiency.

The image pickup lens according to aspect 4 is configured so that an aperture stop is positioned on the object side of the first lens.

As the aperture stop is positioned on the object side of the first lens, it is easy to reduce a CRA (Chief Ray Angle) and obtain sufficient light amount at the periphery of an image plane at which light amount decreases.

The image pickup lens according to aspect 5 is configured so that the object-side surface and image-side surface of the fifth lens have an aspherical shape, which contains at least one inflection point from a center of the lens to a periphery thereof.

As the object-side surface and image-side surface of the fifth lens have an aspherical shape that contains at least one inflection point from the center of the lens to the periphery thereof, it is possible to obtain adequate off-axis performance and CRA.

The image pickup lens according to aspect 6 is configured so that the first lens and the second lens satisfy conditional expressions (3) and (4) below:

$$0.50 < f1/f < 1.00 \qquad (3)$$

$$-1.50 < f2/f < -0.65 \qquad (4)$$

where f is the composite focal length of the entire image pickup lens system, f1 is the focal length of the first lens, and f2 is the focal length of the second lens.

Conditional expression (3) above defines the range of the focal length of the first lens with respect to the focal length of the entire image pickup lens system. If the value is below the lower limit of the conditional expression (3), the focal length of the first lens is too short. This makes it difficult to correct spherical aberration and coma aberration. If, on the contrary, the value exceeds the upper limit thereof, the optical length is too long so that the thickness of the image pickup lens cannot be sufficiently reduced.

Conditional expression (4) above defines the range of the focal length of the second lens with respect to the focal length of the entire image pickup lens system. If the value is below the lower limit of the conditional expression (4), the power of the second lens is insufficient so that chromatic aberration cannot be adequately corrected. If, on the contrary, the value exceeds the upper limit thereof, the focal length of the second lens is too short. This makes it difficult to correct spherical aberration and coma aberration, and the error sensitivity during manufacturing becomes severe.

The image pickup lens according to aspect 7 is configured so that the fourth lens and the fifth lens satisfy conditional expressions (5) and (6) below:

$$0.9 < f4/f < 1.50 \qquad (5)$$

$$-1.70 < f5/f < -0.85 \qquad (6)$$

where f is the composite focal length of the entire image pickup lens system, f4 is the focal length of the fourth lens, and f5 is the focal length of the fifth lens.

Conditional expression (5) above defines the range of the focal length of the fourth lens with respect to the focal length of the entire image pickup lens system. If the value is below the lower limit of the conditional expression (5), the focal length of the fourth lens is too short. This makes it difficult to correct astigmatism and coma aberration, and the error sensitivity during manufacturing becomes severe. If, on the contrary, the value exceeds the upper limit thereof, chromatic aberration of magnification and astigmatism are not adequately corrected so that expected performance is not obtained.

Conditional expression (6) above defines the range of the focal length of the fifth lens with respect to the focal length of the entire image pickup lens system. If the value is below the lower limit of the conditional expression (6), the power of the fifth lens is insufficient. This makes it difficult to decrease the optical length. If, on the contrary, the value exceeds the upper limit thereof, it is difficult to decrease the CRA, and the error sensitivity at low image height during manufacturing becomes severe.

The image pickup lens according to aspect 8 is configured so that the second lens, the third lens, and the fourth lens satisfy conditional expression (8) below:

$$0.0 < f2 \cdot 3 \cdot 4 \qquad (8)$$

where f2·3·4 is the composite focal length of the second, third, and fourth lenses.

Conditional expression (8) above defines the composite focal length of the second, third, and fourth lens. If the value is below the lower limit of the conditional expression (8), the negative power of the second lens is too strong so that the error sensitivity during manufacturing becomes too severe, or the positive power of the fourth lens is too weak so that it is difficult to correct astigmatism and distortion.

The image pickup lens according to aspect 9 is configured so that the first lens, the second lens, the third lens, the fourth lens, and the fifth lens satisfy conditional expressions (9), (10), and (11) below:

$$f1 < |f2| < |f3| \qquad (9)$$

$$f1 < f4 < |f3| \qquad (10)$$

$$f1 < |f5| < |f3| \qquad (11)$$

where f1 is the focal length of the first lens, f2 is the focal length of the second lens, f3 is the focal length of the third lens, f4 is the focal length of the fourth lens, and f5 is the focal length of the fifth lens.

Conditional expression (9) above defines the power relationship between the first lens, the second lens, and the third lens, that is, the focal length relationship. If the value is below the lower limit of the conditional expression (9), the negative power of the second lens is too strong, so that the optical length becomes long, and the error sensitivity during manufacturing becomes severe. If, on the contrary, the value exceeds the upper limit thereof, the power of the third lens is too strong so that it is difficult to obtain adequate off-axis performance.

Conditional expression (10) above defines the power relationship between the first lens, the third lens, and the fourth lens, that is, the focal length relationship. If the value is below the lower limit of the conditional expression (10), the power of the fourth lens is too strong, so that the optical length becomes long, and it is difficult to correct astigmatism and distortion. If, on the contrary, the value exceeds the upper limit thereof, the power of the third lens is too strong so that it is difficult to obtain adequate off-axis performance.

Conditional expression (11) above defines the power relationship between the first lens, the third lens, and the fifth lens, that is, the focal length relationship. If the value is below the lower limit of the conditional expression (11), the negative power of the fifth lens is too strong. This makes it difficult to correct coma aberration and astigmatism. If, on the contrary, the value exceeds the upper limit thereof, the power of the third lens is too strong so that it is difficult to obtain adequate off-axis performance.

The third lens has a weaker power than the other lenses. However, its front and rear aspherical surfaces effectively work to reduce an aberration caused within the second lens. Particularly, its fourth-order aspherical coefficient effectively works and plays an important role to exhibit performance characteristics specific to a combination of five lenses.

The image pickup lens according to aspect 10 is configured so that the curvature radius of the first lens satisfies conditional expression (12) below:

$$-0.40 < r1/r2 < 0.10 \quad (12)$$

where r1 is the curvature radius of the object-side surface of the first lens, and r2 is the curvature radius of the image-side surface of the first lens.

Conditional expression (12) above defines the lens shape of the first lens. If the value is below the lower limit of the conditional expression (12), the optical length cannot be readily reduced. In addition, the error sensitivity during the manufacture of the first lens becomes severe. If, on the contrary, the value exceeds the upper limit thereof, it is difficult to maintain a proper aberration balance so that expected performance is not obtained.

Conditional expression (13) above defines the lens shape of the fourth lens. If the value is below the lower limit of the conditional expression (13), the power of the fourth lens is too weak. Consequently, performance deterioration occurs because it is difficult to correct various aberrations. If, on the contrary, the value exceeds the upper limit thereof, the fourth lens has an excessively strong power or has a small degree of meniscus curvature. In this instance, too, it is difficult to maintain a proper aberration balance so that expected performance is not obtained.

The image pickup lens according to aspect 11 is configured so that the optical length and focal length of the entire image pickup lens system satisfy conditional expression (14) below:

$$1.05 < L/f < 1.30 \quad (14)$$

where L is the distance from a front surface of the first lens to the image plane, and f is the composite focal length of the entire image pickup lens system.

Conditional expression (14) above defines the optical length with respect to the focal length of the entire image pickup lens system. If the value is below the lower limit of the conditional expression (14), it is difficult to correct various aberrations due to an excessively decreased optical length. In addition, the error sensitivity during manufacturing becomes too severe. If, on the contrary, the value exceeds the upper limit thereof, it is difficult to reduce the thickness of the image pickup lens due to an excessively increased optical length.

The image pickup lens according to aspect 12 is configured so that the diameter of the aperture stop satisfies conditional expression (15) below:

$$0.30 < CA1/f < 0.50 \quad (15)$$

where CA1 is the diameter of the aperture stop, and f is the composite focal length of the entire image pickup lens system.

Conditional expression (15) above defines the F-number (Fno), which is an indication of lens brightness. If the value is below the lower limit of the conditional expression (15), the F-number is excessively large so that requested brightness is not achieved in most cases. If, on the contrary, the value exceeds the upper limit thereof, the F-number is excessively small or the distance between an aperture stop (F-number luminous flux restriction plate) and the front surface of the first lens is excessively long. In either case, expected optical performance is not obtained.

DETAILED DESCRIPTION OF THE PREFERRED EMBODIMENTS

Embodiments of the present invention will now be described by using concrete numerical values. In the first to sixth embodiments, the image pickup lens for a solid-state image pickup element includes, in the order from the object side, an aperture stop ST, a first lens L1, a second lens L2, a third lens L3, a fourth lens L4, a fifth lens L5, a plane-parallel glass IR, and an image plane.

In the first to sixth embodiments, the second lens L2, the third lens L3, the fourth lens L4, and the fifth lens L5 are so-called plastic lenses that have at least one aspherical surface and are made of a resin material. It should also be noted that the aperture stop ST is positioned on the object side of the first lens L1. The third lens has a positive refractive power in the first, second, third, fourth, and sixth embodiments below, but it has a negative refractive power in the fifth embodiment. The first, second, third, fourth, and sixth embodiments are shown as reference examples.

The object-side surface and image-side surface of the fifth lens L5 have an aspherical shape that contains at least one inflection point from the center of the lens to the periphery thereof. The aspherical shape in each embodiment is expressed by the following aspherical surface formula in which the apex of a surface is regarded as the origin, the Z-axis is oriented in the direction of an optical axis, and the height in a direction perpendicular to the optical axis is h:

$$Z = (h^2/r)/[1 + \{1 - (1+K)(h^2/r^2)\}^{1/2}] + A_4 h^4 + A_6 h^6 + A_8 h^8 + \ldots$$

It should be noted that the following symbols are used in the above aspherical surface formula and in the description of each embodiment:
Ai: ith-order aspherical coefficient
r: Curvature radius
K: Conic constant
f: Focal length of the entire image pickup lens system
F: F-number
d: Distance between lens surfaces along axis
nd: Refractive index of a lens material relative to d-line
ν: Abbe number of a lens material Further, in the following description (including lens data in tables), the exponent of 10 (e.g., $4.5 \times 10^{-04}$) is expressed by using the letter E (e.g., 4.5E-04), and surface numbers for lens data are sequentially assigned so that, for example, the object-side surface of the first lens L1 is surface 1.

First Embodiment

Figure 1:
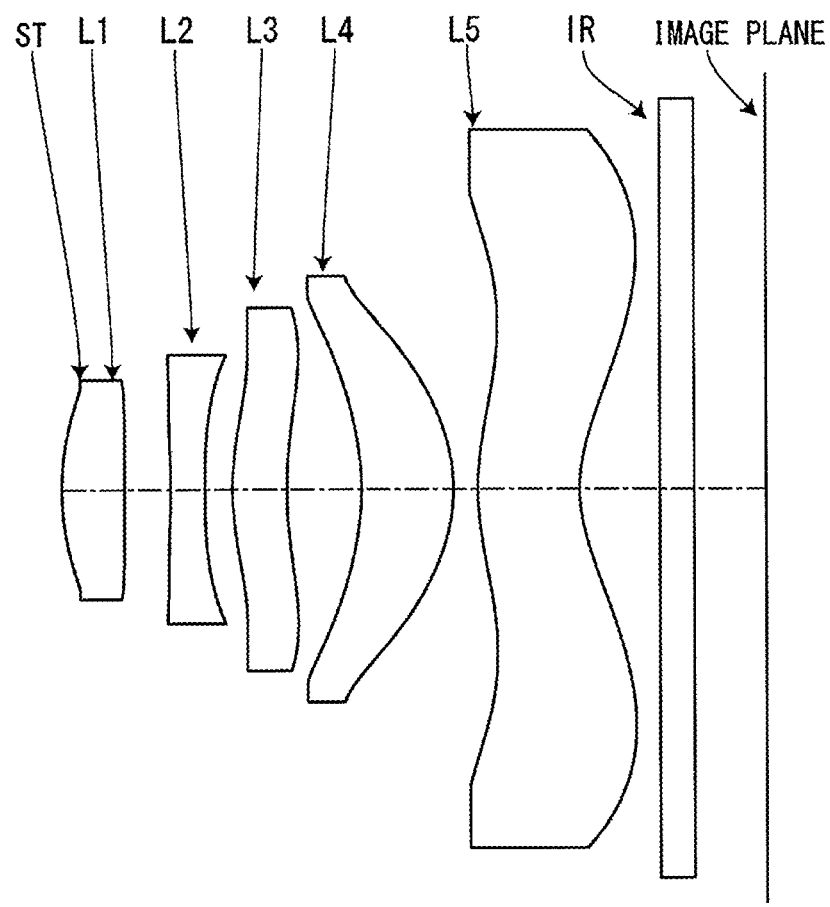
FIG. 1 is a cross-sectional view of an image pickup lens according to a first embodiment of the present invention.
Figure 2:
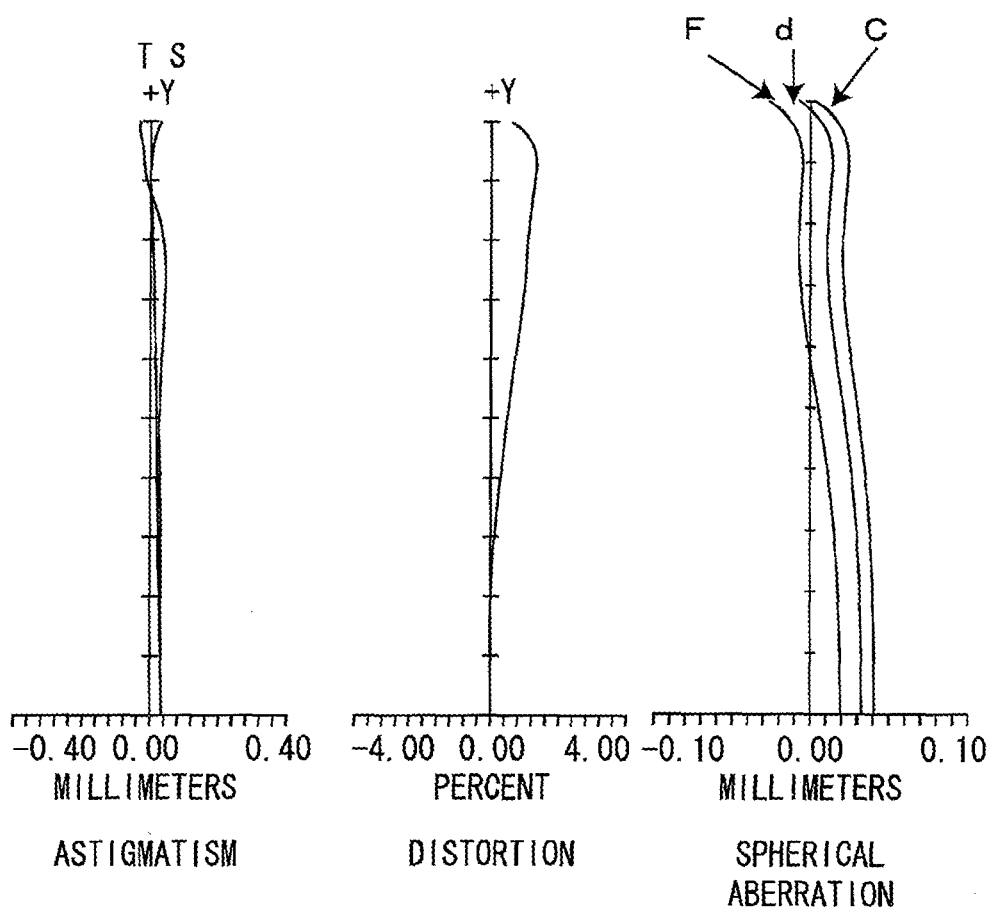
FIG. 2 shows various aberration diagrams of the image pickup lens according to the first embodiment of the present invention.

Table 1 shows numerical data about the image pickup lens according to the first embodiment. FIG. 1 is a cross-sectional view of the image pickup lens. FIG. 2 shows various aberration diagrams.

TABLE 1 f = 4.815 F = 2.8

| Surface Number | r | d | nd | ν | K |
|---|---|---|---|---|---|
| 1 (ST) | 2.297 | 0.550 | 1.5247 | 56.26 | 0.175 |
| 2 | 8384.615 | 0.411 | | | 0 |
| 3 | −6.170 | 0.299 | 1.6142 | 25.58 | 2.471 |
| 4 | 8.586 | 0.242 | | | 0 |
| 5 | 2.383 | 0.481 | 1.5247 | 56.26 | −7.218 |
| 6 | 3.460 | 0.658 | | | −1.443 |
| 7 | −2.320 | 0.815 | 1.5094 | 56.00 | −0.455 |
| 8 | −1.502 | 0.217 | | | −0.645 |
| 9 | 2.288 | 0.897 | 1.5094 | 56.00 | −3.909 |
| 10 | 1.274 | 0.714 | | | −3.515 |
| 11 | ∞ | 0.300 | 1.5168 | 64.20 | |
| 12 | ∞ | 0.635 | | | |

| Surface Number | A4 | A6 | A8 | A10 | A12 | A14 | A16 |
|---|---|---|---|---|---|---|---|
| 1 (ST) | −5.423E−3 | −2.923E−3 | −1.511E−2 | 2.424E−3 | −1.233E−2 | 3.275E−3 | 4.002E−3 |
| 2 | 8.525E−3 | −2.136E−2 | −1.410E−2 | −1.071E−2 | 3.924E−3 | 0 | 0 |
| 3 | 1.427E−1 | −1.124E−1 | 5.307E−2 | −1.649E−2 | −1.541E−2 | 1.183E−2 | 0 |
| 4 | 9.163E−2 | −4.267E−2 | 9.557E−3 | 1.336E−2 | −1.497E−2 | 5.154E−3 | 0 |
| 5 | −4.203E−2 | −4.711E−3 | −2.518E−3 | 2.523E−3 | 0 | 0 | 0 |
| 6 | −4.458E−2 | −3.915E−3 | −4.687E−4 | 4.421E−4 | 0 | 0 | 0 |
| 7 | 5.934E−2 | −4.778E−2 | 2.552E−2 | −7.375E−3 | 9.592E−4 | 0 | 0 |
| 8 | 2.946E−2 | −6.592E−3 | −1.052E−3 | 1.407E−3 | −1.257E−4 | 0 | 0 |
| 9 | −6.925E−2 | 1.547E−2 | −1.984E−3 | 4.124E−5 | 2.050E−5 | −1.537E−6 | −5.993E−9 |
| 10 | −4.400E−2 | 1.076E−2 | −2.049E−3 | 2.486E−4 | −1.983E−5 | 1.014E−6 | −2.577E−8 |

Second Embodiment

Figure 3:
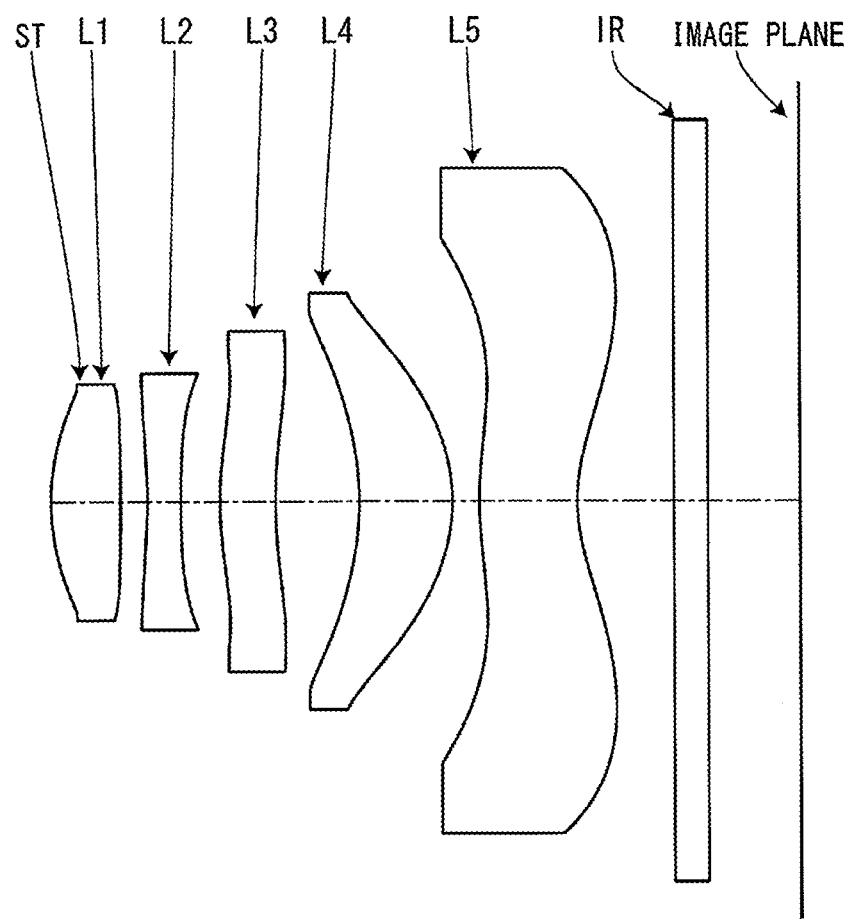
FIG. 3 is a cross-sectional view of the image pickup lens according to a second embodiment of the present invention.
Figure 4:
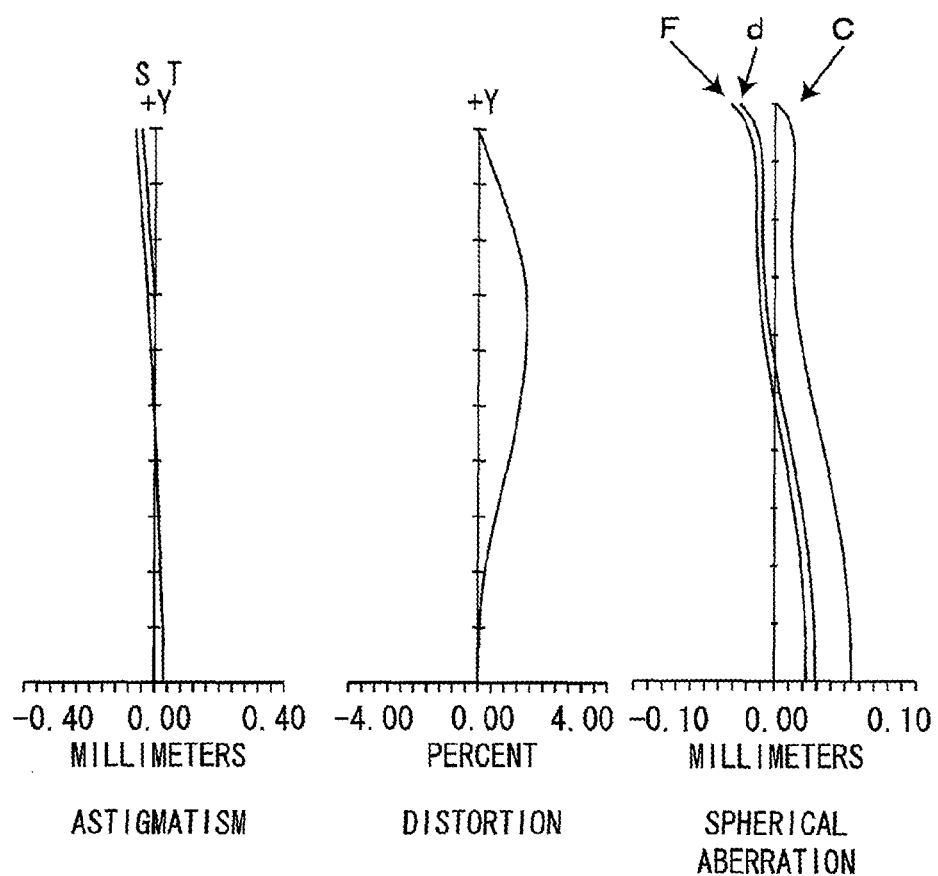
FIG. 4 shows various aberration diagrams of the image pickup lens according to the second embodiment of the present invention.

Table 2 shows numerical data about the image pickup lens according to the second embodiment. FIG. 3 is a cross-sectional view of the image pickup lens. FIG. 4 shows various aberration diagrams.

TABLE 2 f = 5.372 F = 2.8

| Surface Number | r | d | nd | ν | K |
|---|---|---|---|---|---|
| 1 (ST) | 2.035 | 0.605 | 1.497 | 81.60 | 0.145 |
| 2 | −19.788 | 0.233 | | | 0 |
| 3 | −4.221 | 0.295 | 1.6142 | 25.58 | −1.602 |
| 4 | 13.376 | 0.341 | | | 0 |
| 5 | 3.098 | 0.486 | 1.5247 | 56.26 | −11.308 |
| 6 | 4.140 | 0.731 | | | 0.271 |
| 7 | −2.446 | 0.818 | 1.5247 | 56.26 | −0.334 |
| 8 | −1.493 | 0.239 | | | −0.653 |
| 9 | 3.310 | 0.855 | 1.5247 | 56.26 | −12.446 |

TABLE 2-continued

| | | f = 5.372 F = 2.8 | | | |
|---|---|---|---|---|---|
| 10 | 1.488 | 0.849 | | | −4.788 |
| 11 | ∞ | 0.300 | 1.5168 | 64.20 | |
| 12 | ∞ | 0.803 | | | |

| Surface Number | A4 | A6 | A8 | A10 | A12 | A14 | A16 |
|---|---|---|---|---|---|---|---|
| 1 (ST) | −7.452E−3 | −1.617E−4 | −1.335E−2 | 4.383E−3 | −9.221E−3 | 4.483E−3 | −3.834E−3 |
| 2 | 1.998E−2 | −2.240E−2 | −1.467E−2 | −1.152E−2 | 3.209E−3 | 0 | 0 |
| 3 | 1.470E−1 | −1.118E−1 | 5.112E−2 | −1.648E−2 | −1.373E−2 | 1.325E−2 | 0 |
| 4 | 9.526E−2 | −4.060E−2 | 1.128E−2 | 1.414E−2 | −1.462E−2 | 5.794E−3 | 0 |
| 5 | −4.356E−2 | −4.909E−3 | −2.662E−3 | 2.513E−3 | 0 | 0 | 0 |
| 6 | −4.106E−2 | −3.596E−3 | 3.640E−7 | 6.811E−4 | 0 | 0 | 0 |
| 7 | 5.620E−2 | −4.763E−2 | 2.579E−2 | −7.309E−3 | 9.426E−4 | 0 | 0 |
| 8 | 3.109E−2 | −6.202E−3 | −9.889E−4 | 1.388E−3 | −1.345E−4 | 0 | 0 |
| 9 | −7.078E−2 | 1.540E−2 | −1.993E−3 | 4.351E−5 | 2.090E−5 | 1.538E−6 | −1.030E−8 |
| 10 | −4.561E−2 | 1.071E−2 | −2.036E−3 | 2.488E−4 | −1.998E−5 | 9.963E−7 | −2.502E−8 |

Third Embodiment

Figure 5:
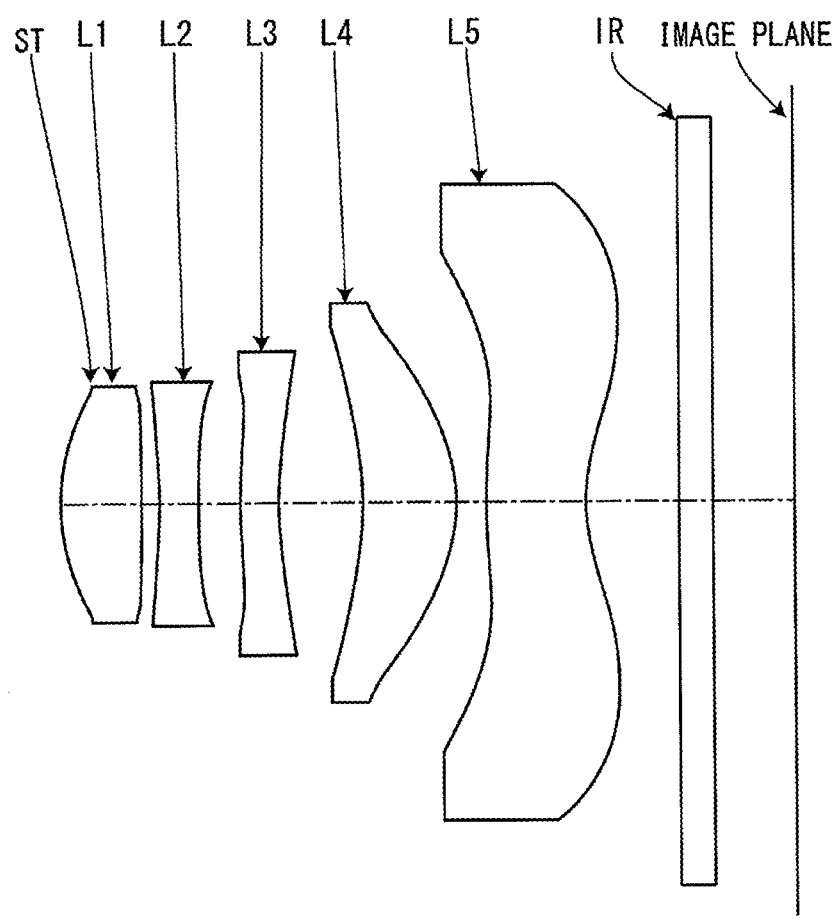
FIG. 5 is a cross-sectional view of the image pickup lens according to a third embodiment of the present invention.
Figure 6:
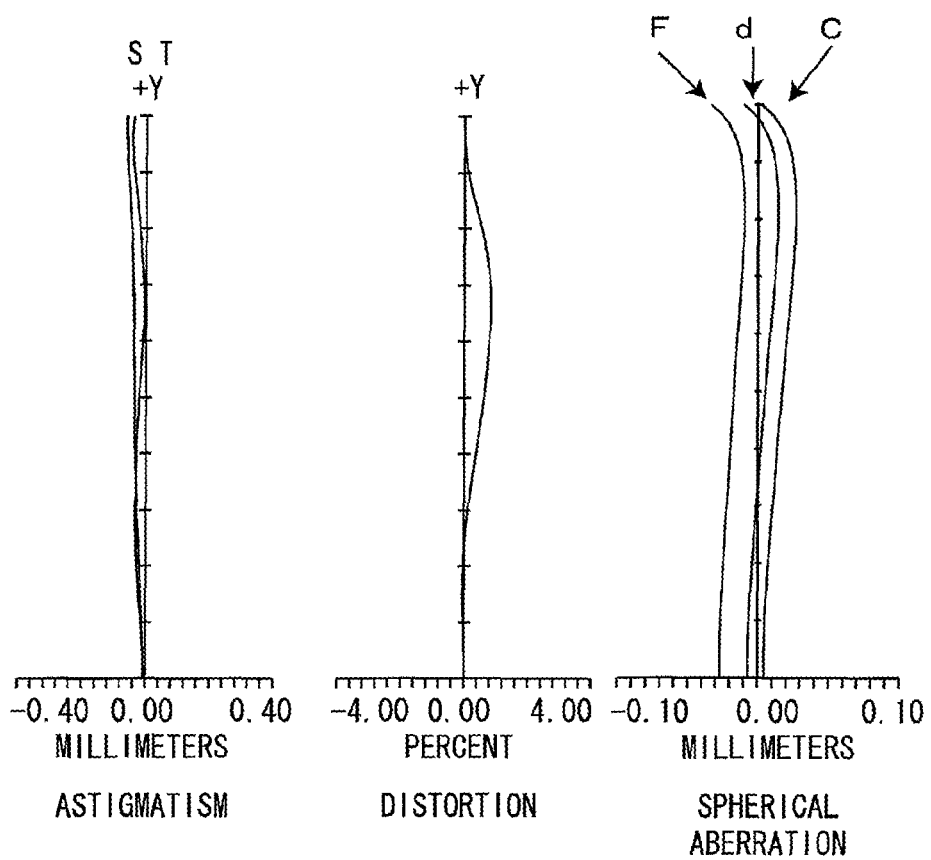
FIG. 6 shows various aberration diagrams of the image pickup lens according to the third embodiment of the present invention.

Table 3 shows numerical data about the image pickup lens according to the third embodiment. FIG. 5 is a cross-sectional view of the image pickup lens. FIG. 6 shows various aberration diagrams.

TABLE 3

| | | f = 5.269 F = 2.8 | | | |
|---|---|---|---|---|---|
| Surface Number | r | d | nd | ν | K |
| 1 (ST) | 2.093 | 0.608 | 1.5441 | 56.00 | 0.123 |
| 2 | −25.611 | 0.211 | | | 0 |
| 3 | −4.074 | 0.307 | 1.5850 | 30.00 | −1.357 |
| 4 | 11.977 | 0.336 | | | 0 |
| 5 | 3.166 | 0.478 | 1.5441 | 56.00 | −11.659 |
| 6 | 4.064 | 0.731 | | | 0.351 |
| 7 | −2.478 | 0.790 | 1.5247 | 56.26 | −0.290 |
| 8 | −1.540 | 0.274 | | | −0.648 |
| 9 | 3.353 | 0.859 | 1.5247 | 56.26 | −12.746 |
| 10 | 1.488 | 0.794 | | | −4.901 |
| 11 | ∞ | 0.300 | 1.5168 | 64.20 | |
| 12 | ∞ | 0.713 | | | |

| Surface Number | A4 | A6 | A8 | A10 | A12 | A14 | A16 |
|---|---|---|---|---|---|---|---|
| 1 (ST) | −8.004E−3 | 4.932E−5 | −1.335E−2 | 4.345E−3 | −9.202E−3 | 4.586E−3 | −3.708E−3 |
| 2 | 1.747E−2 | −2.375E−2 | −1.468E−2 | −1.094E−2 | 3.436E−3 | 0 | 0 |
| 3 | 1.466E−1 | −1.114E−1 | 5.110E−2 | −1.663E−2 | −1.384E−2 | 1.328E−2 | 0 |
| 4 | 9.639E−2 | −4.030E−2 | 1.113E−2 | 1.390E−2 | −1.439E−2 | 5.879E−3 | 0 |
| 5 | −4.371E−2 | −5.274E−3 | −3.020E−3 | 2.317E−3 | 0 | 0 | 0 |
| 6 | −4.084E−2 | −3.546E−3 | −2.715E−5 | 7.200E−4 | 0 | 0 | 0 |
| 7 | 5.558E−2 | −4.774E−2 | 2.575E−2 | −7.317E−3 | 9.431E−4 | 0 | 0 |
| 8 | 3.087E−2 | −6.449E−3 | −1.021E−3 | 1.386E−3 | −1.344E−4 | 0 | 0 |
| 9 | −7.043E−2 | 1.531E−2 | −2.006E−3 | 4.195E−5 | 2.091E−5 | −1.493E−6 | 8.400E−10 |
| 10 | −4.574E−2 | 1.069E−2 | −2.047E−3 | 2.484E−4 | −1.994E−5 | 1.002E−6 | −2.527E−8 |

Fourth Embodiment

Figure 7:
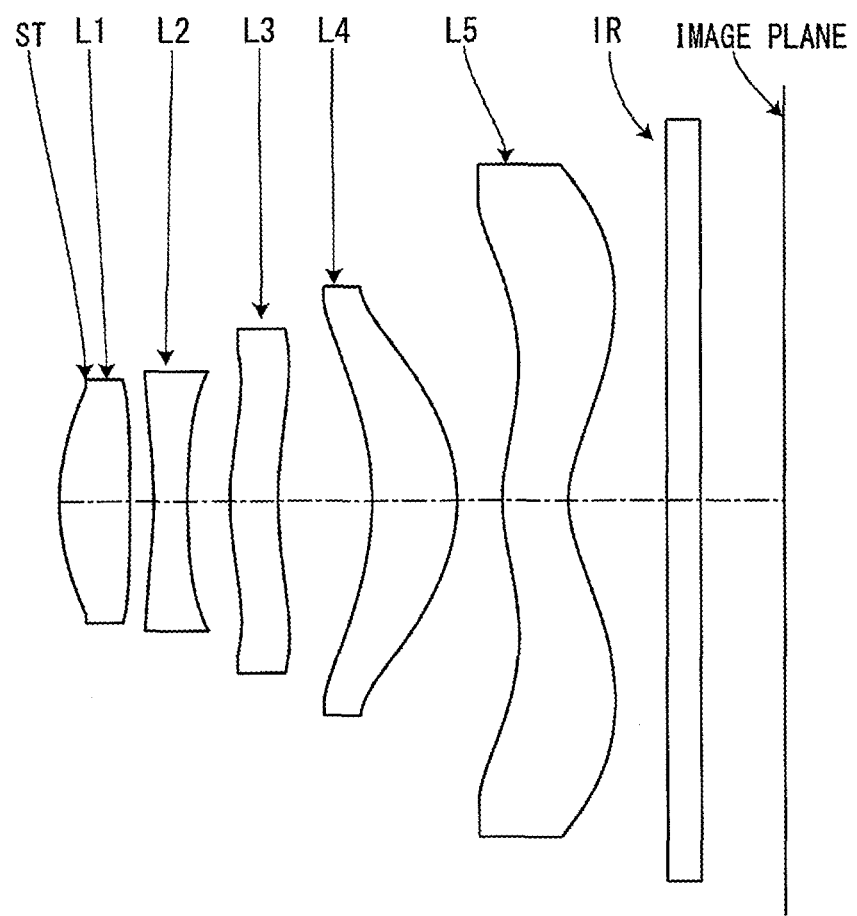
FIG. 7 is a cross-sectional view of the image pickup lens according to a fourth embodiment of the present invention.
Figure 8:
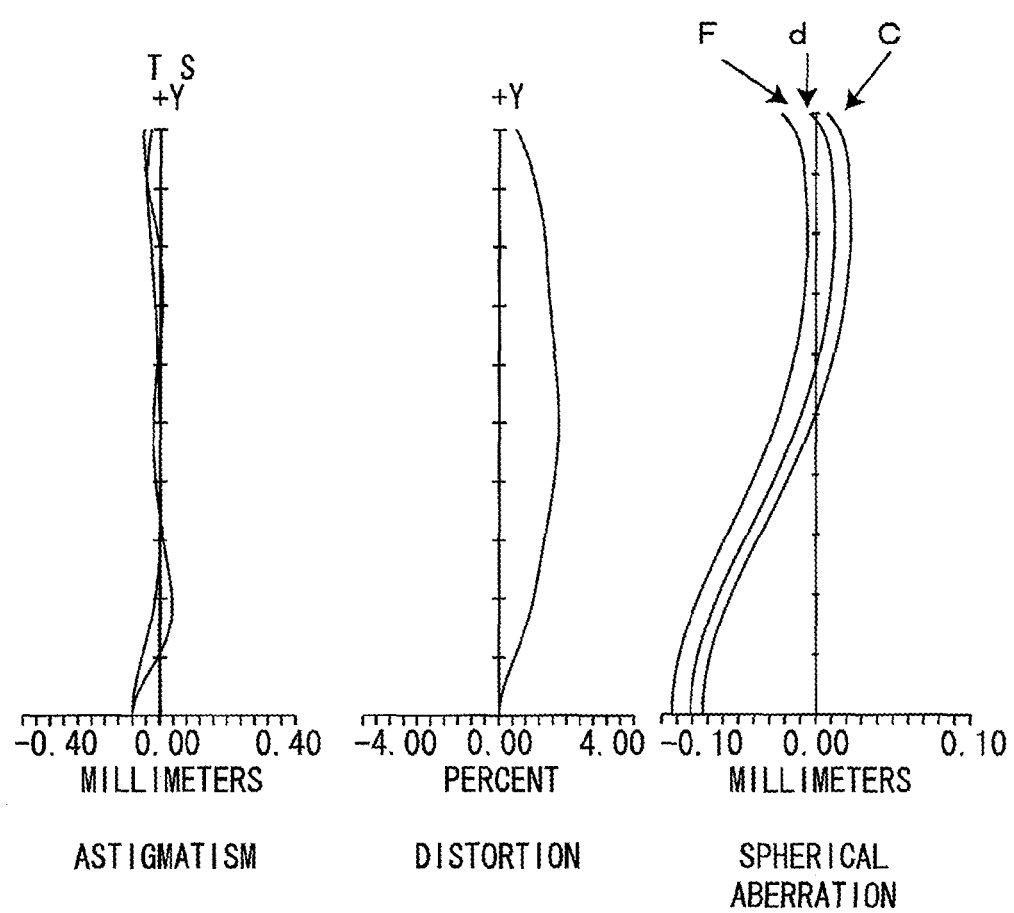
FIG. 8 shows various aberration diagrams of the image pickup lens according to the fourth embodiment of the present invention.

Table 4 shows numerical data about the image pickup lens according to the fourth embodiment. FIG. 7 is a cross-sectional view of the image pickup lens. FIG. 8 shows various aberration diagrams.

TABLE 4 f = 5.187 F = 2.7

| Surface Number | r | d | nd | ν | K |
|---|---|---|---|---|---|
| 1 (ST) | 2.119 | 0.626 | 1.5441 | 56.00 | 0.177 |
| 2 | −11.544 | 0.208 | | | 0 |
| 3 | −3.147 | 0.298 | 1.5850 | 30.00 | −5.094 |
| 4 | 9.796 | 0.373 | | | 0 |
| 5 | 2.701 | 0.428 | 1.5441 | 56.00 | −11.168 |
| 6 | 3.842 | 0.837 | | | 0.129 |
| 7 | −2.253 | 0.750 | 1.5247 | 56.26 | −0.654 |
| 8 | −1.467 | 0.401 | | | −0.694 |
| 9 | 1.656 | 0.587 | 1.5247 | 56.26 | −10.501 |
| 10 | 0.981 | 0.874 | | | −4.578 |
| 11 | ∞ | 0.300 | 1.5168 | 64.20 | |
| 12 | ∞ | 0.742 | | | |

| Surface Number | A4 | A6 | A8 | A10 | A12 | A14 | A16 |
|---|---|---|---|---|---|---|---|
| 1 (ST) | −7.510E−3 | 1.743E−3 | −1.246E−2 | 5.493E−3 | −8.377E−3 | 4.978E−3 | −3.500E−3 |
| 2 | 2.507E−2 | −1.481E−2 | −1.129E−2 | −1.181E−2 | 3.172E−3 | 0 | 0 |
| 3 | 1.526E−1 | −1.113E−1 | 5.074E−2 | −1.533E−2 | −1.395E−2 | 1.133E−2 | 0 |
| 4 | 9.710E−2 | −4.050E−2 | 1.124E−2 | 1.365E−2 | −1.474E−2 | 5.407E−3 | 0 |
| 5 | −3.599E−2 | −8.738E−3 | −4.179E−3 | 2.048E−3 | 0 | 0 | 0 |
| 6 | −4.051E−2 | −4.801E−3 | −6.520E−4 | 5.650E−4 | 0 | 0 | 0 |
| 7 | 6.564E−2 | −4.702E−2 | 2.607E−2 | −7.359E−3 | 8.648E−4 | 0 | 0 |
| 8 | 3.490E−2 | −3.356E−3 | −1.098E−3 | 1.296E−3 | −1.421E−4 | 0 | 0 |
| 9 | −7.077E−2 | 1.589E−2 | −1.963E−3 | 4.145E−5 | 2.045E−5 | −1.557E−6 | −2.866E−9 |
| 10 | −5.003E−2 | 1.088E−2 | −1.968E−3 | 2.477E−4 | −2.068E−5 | 9.622E−7 | −1.548E−8 |

Fifth Embodiment

Figure 9:
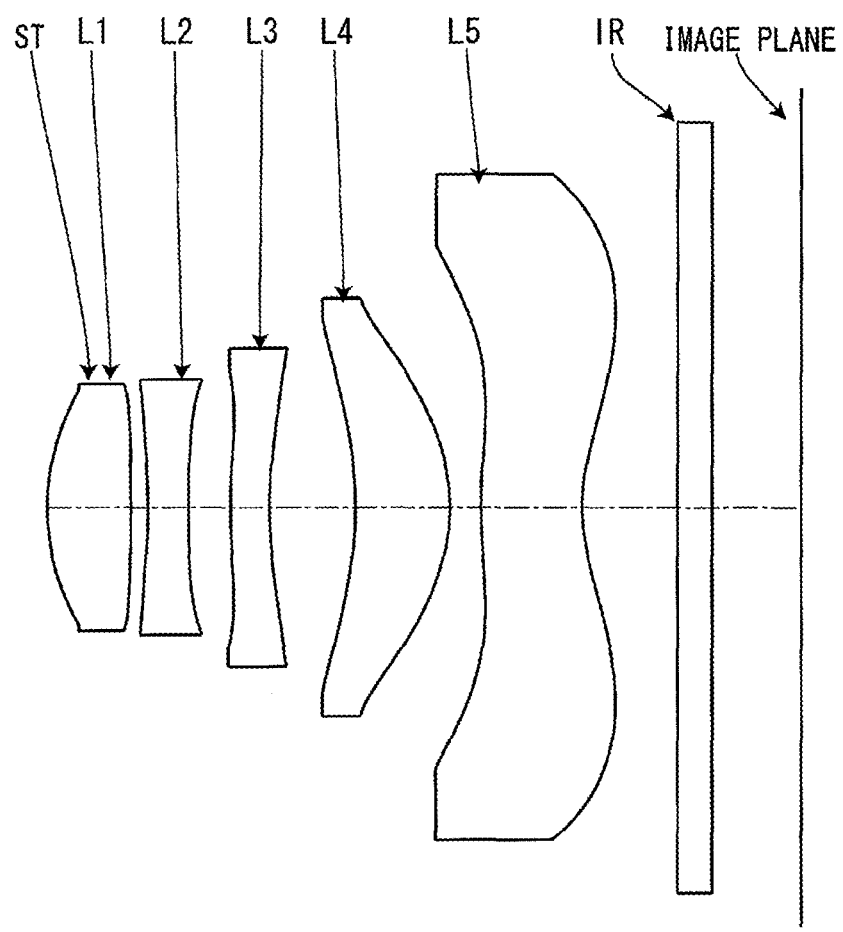
FIG. 9 is a cross-sectional view of the image pickup lens according to a fifth embodiment of the present invention.
Figure 10:
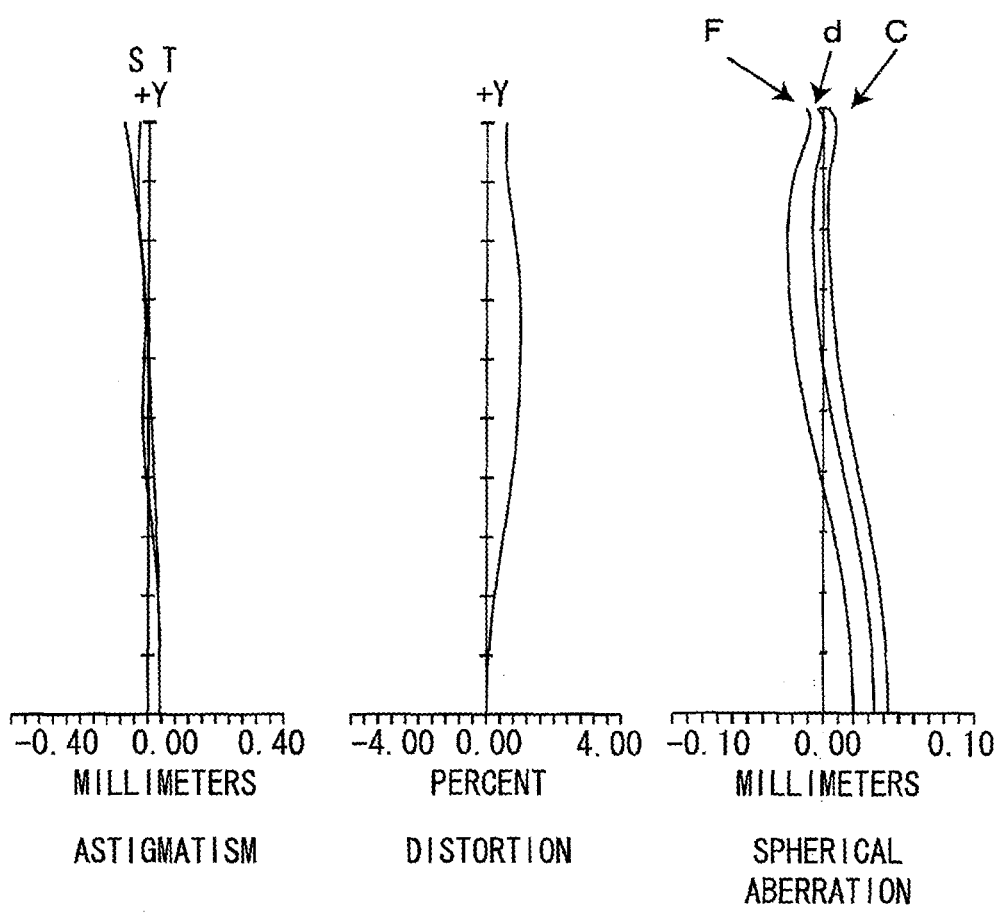
FIG. 10 shows various aberration diagrams of the image pickup lens according to the fifth embodiment of the present invention.

Table 5 shows numerical data about the image pickup lens according to the fifth embodiment. FIG. 9 is a cross-sectional view of the image pickup lens. FIG. 10 shows various aberration diagrams.

TABLE 5 f = 5.700 F = 2.8

| Surface Number | r | d | nd | ν | K |
|---|---|---|---|---|---|
| 1 (ST) | 1.974 | 0.720 | 1.5311 | 56.00 | 0.260 |
| 2 | −14.375 | 0.150 | | | 0 |
| 3 | −4.100 | 0.350 | 1.6142 | 25.58 | 1.248 |
| 4 | 55.800 | 0.360 | | | 0 |
| 5 | 5.600 | 0.340 | 1.5311 | 56.00 | −20.645 |
| 6 | 3.868 | 0.750 | | | 1.356 |
| 7 | −3.010 | 0.820 | 1.5311 | 56.00 | −0.508 |
| 8 | −1.634 | 0.270 | | | −0.656 |
| 9 | 4.156 | 0.880 | 1.5311 | 56.00 | −29.637 |
| 10 | 1.582 | 0.830 | | | −5.617 |
| 11 | ∞ | 0.300 | 1.5168 | 64.20 | |
| 12 | ∞ | 0.770 | | | |

| Surface Number | A4 | A6 | A8 | A10 | A12 | A14 | A16 |
|---|---|---|---|---|---|---|---|
| 1 (ST) | −6.011E−3 | 4.555E−3 | −1.140E−2 | 5.896E−3 | −7.660E−3 | 5.633E−3 | −3.706E−3 |
| 2 | 3.346E−2 | −2.148E−2 | −1.342E−2 | −1.061E−2 | 3.525E−3 | 0 | 0 |
| 3 | 1.407E−1 | −1.057E−1 | 4.976E−2 | −1.790E−2 | −1.431E−2 | 1.182E−2 | 0 |
| 4 | 1.000E−1 | −4.704E−2 | 1.326E−2 | 1.542E−2 | −1.468E−2 | 5.766E−3 | 0 |
| 5 | −5.387E−2 | −6.340E−3 | −1.971E−3 | 2.628E−3 | 0 | 0 | 0 |
| 6 | −4.023E−2 | 2.476E−4 | 1.005E−3 | 6.170E−4 | 0 | 0 | 0 |
| 7 | 5.679E−2 | −4.556E−2 | 2.594E−2 | −7.443E−3 | 8.944E−4 | 0 | 0 |

TABLE 5-continued

| | | | f = 5.700 F = 2.8 | | | | |
|---|---|---|---|---|---|---|---|
| 8 | 3.073E−2 | −5.791E−3 | −8.590E−4 | 1.367E−3 | −1.517E−4 | 0 | 0 |
| 9 | −6.996E−2 | 1.530E−2 | −1.966E−3 | 5.619E−5 | 2.207E−5 | −1.613E−6 | −4.417E−8 |
| 10 | −4.594E−2 | 1.064E−2 | −2.039E−3 | 2.506E−4 | −2.003E−5 | 9.526E−7 | −2.202E−8 |

Sixth Embodiment

Figure 11:
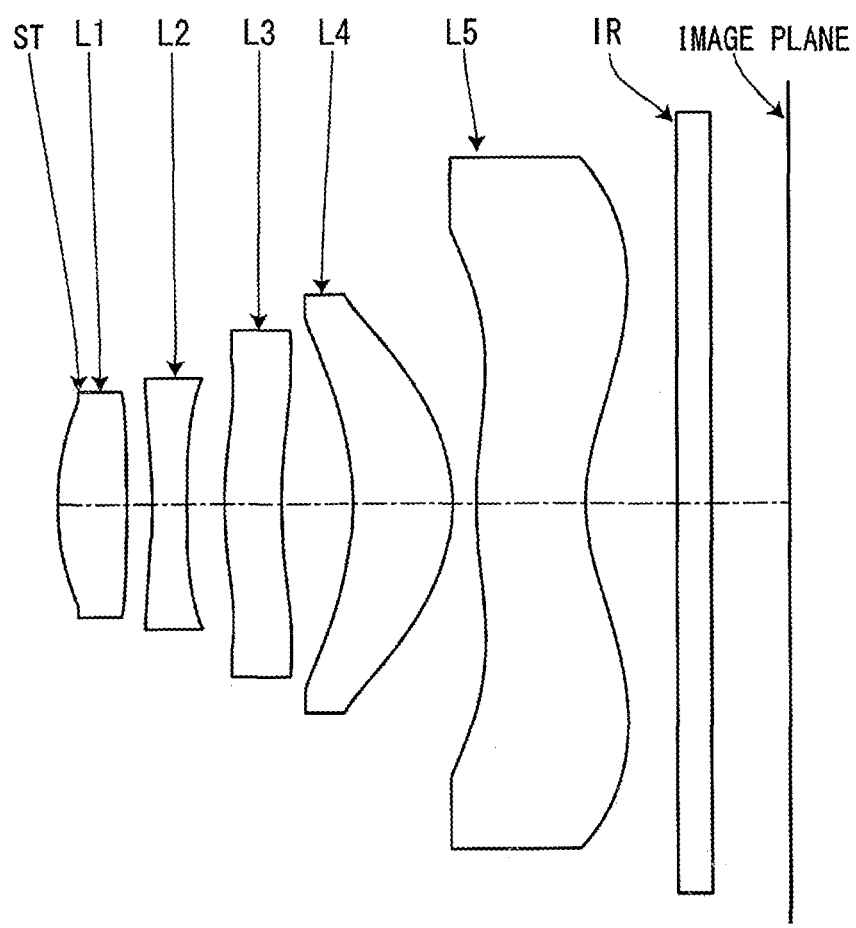
FIG. 11 is a cross-sectional view of the image pickup lens according to a sixth embodiment of the present invention.
Figure 12:
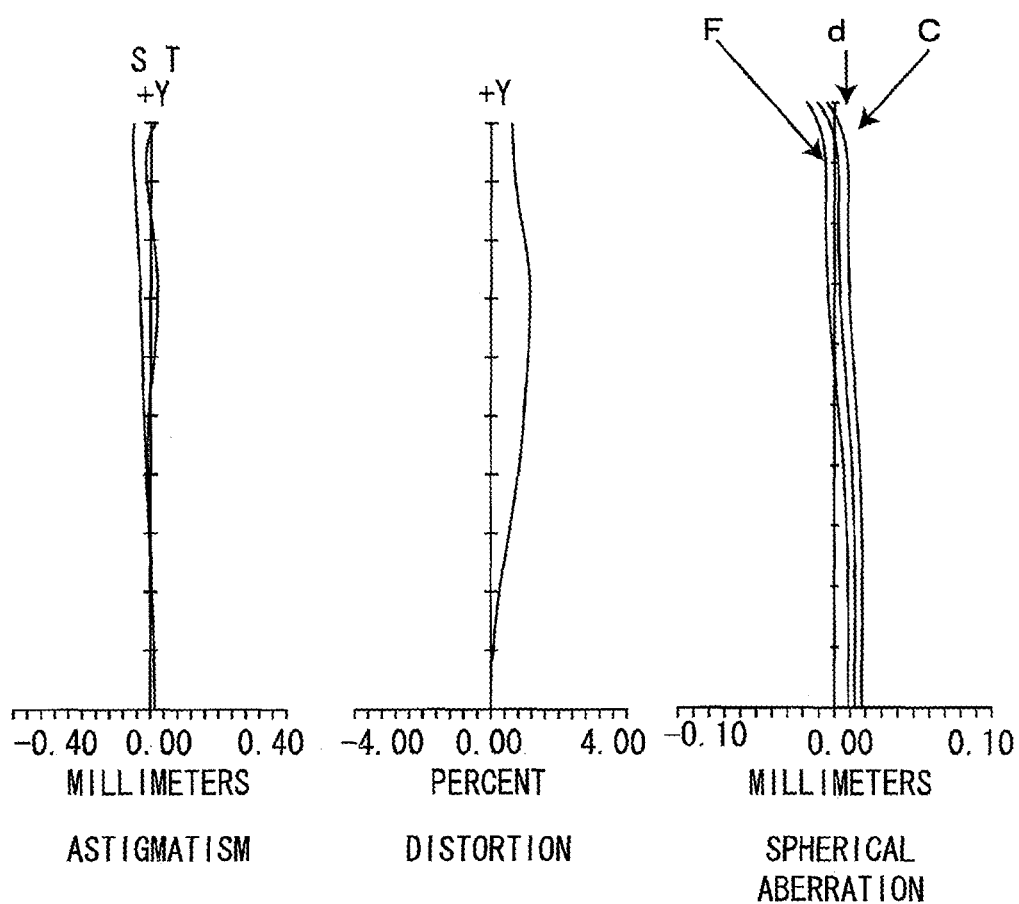
FIG. 12 shows various aberration diagrams of the image pickup lens according to the sixth embodiment of the present invention.

Table 6 shows numerical data about the image pickup lens according to the sixth embodiment. FIG. 11 is a cross-sectional view of the image pickup lens. FIG. 12 shows various aberration diagrams.

TABLE 6

| | | | f = 4.986 F = 2.8 | | |
|---|---|---|---|---|---|
| Surface Number | r | d | nd | ν | K |
| 1 (ST) | 2.084 | 0.604 | 1.5311 | 56.00 | 0.168 |
| 2 | −21.296 | 0.222 | | | 0 |
| 3 | −3.958 | 0.300 | 1.6142 | 25.58 | −1.423 |
| 4 | 13.768 | 0.323 | | | 0 |
| 5 | 3.075 | 0.497 | 1.5311 | 56.00 | −11.809 |
| 6 | 4.139 | 0.624 | | | 0.275 |
| 7 | −2.412 | 0.870 | 1.5247 | 56.26 | −0.378 |
| 8 | −1.484 | 0.208 | | | −0.649 |
| 9 | 3.407 | 0.955 | 1.5247 | 56.26 | −5.620 |
| 10 | 1.561 | 0.802 | | | −4.276 |
| 11 | ∞ | 0.300 | 1.5168 | 64.20 | |
| 12 | ∞ | 0.674 | | | |

| Surface Number | A4 | A6 | A8 | A10 | A12 | A14 | A16 |
|---|---|---|---|---|---|---|---|
| 1 (ST) | −6.789E−3 | 2.618E−4 | −1.386E−2 | 3.682E−3 | −9.711E−3 | 4.535E−3 | −2.955E−3 |
| 2 | 1.842E−2 | −2.358E−2 | −1.510E−2 | −1.166E−2 | 3.030E−3 | 0 | 0 |
| 3 | 1.465E−1 | −1.117E−1 | 5.082E−2 | −1.681E−2 | −1.391E−2 | 1.334E−2 | 0 |
| 4 | 9.611E−2 | −4.021E−2 | 1.153E−2 | 1.421E−2 | −1.461E−2 | 5.550E−3 | 0 |
| 5 | −4.518E−2 | −5.504E−3 | −2.914E−3 | 2.385E−3 | 0 | 0 | 0 |
| 6 | −4.104E−2 | −3.503E−3 | −5.896E−5 | 6.932E−4 | 0 | 0 | 0 |
| 7 | 5.684E−2 | −4.751E−2 | 2.584E−2 | −7.290E−3 | 9.508E−4 | 0 | 0 |
| 8 | 3.092E−2 | −6.249E−3 | −1.018E−3 | 1.379E−3 | −1.373E−4 | 0 | 0 |
| 9 | −6.971E−2 | 1.550E−2 | −1.986E−3 | 4.363E−5 | 2.079E−5 | −1.571E−6 | −1.765E−8 |
| 10 | −4.447E−2 | 1.070E−2 | −2.036E−3 | 2.489E−4 | −1.996E−5 | 1.000E−6 | −2.448E−8 |

Table 7 below relates to the first to sixth embodiments and shows values for conditional expressions (1) to (17) below.

Conditional expression (1) concerns the Abbe number of a material used for the first lens L1. Conditional expression (2) concerns the Abbe number of a material used for the second lens L2.

$$45 < v1 < 90 \quad \text{Conditional expression (1)}$$

$$22 < v2 < 35 \quad \text{Conditional expression (2)}$$

where v1 is the Abbe number for d-line of the first lens, and v2 is the Abbe number for d-line of the second lens.

Conditional expression (3) defines the range of the focal length of the first lens L1 with respect to the focal length of the entire image pickup lens system. Conditional expression (4) defines the range of the focal length of the second lens L2 with respect to the focal length of the entire image pickup lens system.

$$0.5 < f1/f < 1.00 \quad \text{Conditional expression (3)}$$

$$-1.50 < f2/f < -0.65 \quad \text{Conditional expression (4)}$$

where f is the composite focal length of the entire image pickup lens system, f1 is the focal length of the first lens, and f2 is the focal length of the second lens.

Conditional expression (5) defines the range of the focal length of the fourth lens L4 with respect to the focal length of the entire image pickup lens system. Conditional expression (6) defines the range of the focal length of the fifth lens L5 with respect to the focal length of the entire image pickup lens system.

$$0.9 < f4/f < 1.50 \quad \text{Conditional expression (5)}$$

$$-1.70 < f5/f < -0.85 \quad \text{Conditional expression (6)}$$

where f is the composite focal length of the entire image pickup lens system, f4 is the focal length of the fourth lens, and f5 is the focal length of the fifth lens.

Conditional expression (7) defines the ratio between the focal length of the first lens L1 and the focal length of the third lens L3.

$$-0.15 < f1/f3 < 0.37 \quad \text{Conditional expression (7)}$$

where f1 is the focal length of the first lens, and f3 is the focal length of the third lens.

Conditional expression (8) defines the composite focal length of the second lens L2, the third lens L3, and the fourth lens L4.

$$0.0 < f2 \cdot 3 \cdot 4 \quad \text{Conditional expression (8)}$$

Conditional expression (9) defines the power relationship between the first lens L1, the second lens L2, and the third lens L3, that is, the focal length relationship. Conditional expression (10) defines the power relationship between the first lens L1, the third lens L3, and the fourth lens L4, that is, the focal length relationship. Conditional expression (11) defines the power relationship between the first lens L1, the third lens L3, and the fifth lens L5, that is, the focal length relationship.

$$f1<|f2|<|f3| \quad \text{Conditional expression (9)}$$

$$f1<f4<|f3| \quad \text{Conditional expression (10)}$$

$$f1<|f5|<|f3| \quad \text{Conditional expression (11)}$$

Conditional expression (12) defines the lens shape of the first lens L1.

$$-0.40<r1/r2<0.10 \quad \text{Conditional expression (12)}$$

where r1 is the curvature radius of the object-side surface of the first lens, and r2 is the curvature radius of the image-side surface of the first lens.

Conditional expression (13) defines the lens shape of the fourth lens L4.

$$1.4<r7/r8<3.0 \quad \text{Conditional expression (13)}$$

where r7 is the curvature radius of the object-side surface of the fourth lens, and r8 is the curvature radius of the image-side surface of the fourth lens.

Conditional expression (14) defines the optical length with respect to the focal length.

$$1.05<L/f<1.30 \quad \text{Conditional expression (14)}$$

where L is the distance from the front surface of the first lens to the image plane, and f is the composite focal length of the entire image pickup lens system.

Conditional expression (15) defines the F-number (Fno), which is an indication of lens brightness.

$$0.30<CA1/f<0.50 \quad \text{Conditional expression (15)}$$

where CA1 is the diameter of the aperture stop, and f is the composite focal length of the entire image pickup lens system.

Conditional expression (16) defines the range of the focal length of the second lens L2 with respect to the focal length of the entire image pickup lens system, and relates to a case where more stringent conditions than those defined by conditional expression (4) are satisfied.

$$-1.30<f2/f<-0.75 \quad \text{Conditional expression (16)}$$

where f is the composite focal length of the entire image pickup lens system, and f2 is the focal length of the second lens.

Conditional expression (17) defines the lens shape of the fourth lens L4 and relates to a case where more stringent conditions than those defined by conditional expression (13) are satisfied.

$$1.45<r7/r8<2.0 \quad \text{Conditional expression (17)}$$

where r7 is the curvature radius of the object-side surface of the fourth lens, and r8 is the curvature radius of the image-side surface of the fourth lens.

TABLE 7

| | | Reference Example | | | | |
|---|---|---|---|---|---|---|
| | Fifth Embodiment | First Embodiment | Second Embodiment | Third Embodiment | Fourth Embodiment | Sixth Embodiment |
| Conditional Expression (1) | 56.00 | 56.26 | 81.60 | 56.00 | 56.00 | 56.00 |
| Conditional Expression (2) | 25.58 | 25.58 | 25.58 | 30.00 | 30.00 | 25.58 |
| Conditional Expression (3) | 0.582 | 0.909 | 0.698 | 0.680 | 0.645 | 0.723 |
| Conditional Expression (4) | −1.089 | −1.205 | −0.966 | −0.979 | −0.778 | −0.997 |
| Conditional Expression (5) | 0.978 | 1.300 | 1.050 | 1.141 | 1.163 | 1.115 |
| Conditional Expression (6) | −0.957 | −1.671 | −1.144 | −1.150 | −1.262 | −1.340 |
| Conditional Expression (7) | −0.131 | 0.346 | 0.185 | 0.162 | 0.226 | 0.186 |
| Conditional Expression (8) | 18.816 | 10.266 | 10.597 | 13.323 | 15.698 | 10.806 |
| Conditional Expression (9) | | | | | | |
| f1 | 3.319 | 4.379 | 3.747 | 3.584 | 3.344 | 3.606 |
| \|f2\| | 6.205 | 5.800 | 5.191 | 5.160 | 4.037 | 4.973 |
| \|f3\| | 25.268 | 12.647 | 20.214 | 22.174 | 14.764 | 19.382 |
| Conditional Expression (10) | | | | | | |
| f1 | 3.319 | 4.379 | 3.747 | 3.584 | 3.344 | 3.606 |
| f4 | 5.577 | 6.258 | 5.638 | 6.011 | 6.033 | 5.558 |
| \|f3\| | 25.268 | 12.647 | 20.214 | 22.174 | 14.764 | 19.382 |
| Conditional | | | | | | |

TABLE 7-continued

| | Reference Example | | | | | |
| --- | --- | --- | --- | --- | --- | --- |
| | Fifth Embodiment | First Embodiment | Second Embodiment | Third Embodiment | Fourth Embodiment | Sixth Embodiment |
| Expression (11) | | | | | | |
| f1 | 3.319 | 4.379 | 3.747 | 3.584 | 3.344 | 3.606 |
| |f5| | 5.457 | 8.045 | 6.144 | 6.059 | 6.546 | 6.680 |
| |f3| | 25.268 | 12.647 | 20.214 | 22.174 | 14.764 | 19.382 |
| Conditional Expression (12) | −0.137 | 0.000 | −0.103 | −0.082 | −0.184 | −0.098 |
| Conditional Expression (13) | 1.842 | 1.545 | 1.638 | 1.609 | 1.536 | 1.625 |
| Conditional Expression (14) | 1.147 | 1.292 | 1.220 | 1.215 | 1.238 | 1.279 |
| Conditional Expression (15) | 0.355 | 0.357 | 0.355 | 0.357 | 0.385 | 0.355 |

As shown in Table 7, the first to sixth embodiments of the present invention satisfy all of conditional expressions (1) to (17). Conditional expressions (1) and (2) define the Abbe number of the first lens L1 and the second lens L2, respectively. If the value is below the lower limit of the conditional expression (1), the variance value difference from the second lens is decreased so that chromatic aberration correction is insufficient. If, on the contrary, the value exceeds the upper limit thereof, the balance between axial chromatic aberration and chromatic aberration of magnification is impaired so that performance deterioration occurs at the periphery of an image area. If the value is below the lower limit of the conditional expression (2), the balance between axial chromatic aberration and off-axis chromatic aberration is impaired so that performance deterioration occurs at the periphery of the image area. If, on the contrary, the value exceeds the upper limit thereof, the variance value difference from the first lens is decreased so that chromatic aberration correction is insufficient. However, when conditional expressions (1) and (2) are satisfied, a proper balance is maintained between axial chromatic aberration and chromatic aberration of magnification. This makes it possible to prevent performance deterioration at the periphery of the image area and provide excellent chromatic aberration correction.

Conditional expressions (3) and (4) define the range of the focal length of the first lens L1 and the second lens L2, respectively, with respect to the focal length of the entire image pickup lens system. If the value is below the lower limit of the conditional expression (3), the focal length of the first lens L1 is too short. This makes it difficult to correct spherical aberration and coma aberration. If, on the contrary, the value exceeds the upper limit thereof, the optical length is too long so that the thickness of the image pickup lens cannot be sufficiently reduced. If the value is below the lower limit of the conditional expression (4), the power of the second lens L2 is insufficient so that chromatic aberration cannot be adequately corrected. If, on the contrary, the value exceeds the upper limit thereof, the focal length of the second lens L2 is too short. This makes it difficult to correct spherical aberration and coma aberration, and the error sensitivity during manufacturing becomes severe. However, when conditional expressions (3) and (4) are satisfied, it is possible to properly correct spherical aberration and coma aberration. Further, the power of the second lens L2 becomes sufficient, making it possible to properly correct chromatic aberration, spherical aberration, and coma aberration.

Conditional expression (5) defines the range of the focal length of the fourth lens L4 with respect to the focal length of the entire image pickup lens system. If the value is below the lower limit of the conditional expression (5), the focal length of the fourth lens L4 is too short. This makes it difficult to correct astigmatism and coma aberration, and the error sensitivity during manufacturing becomes severe. If, on the contrary, the value exceeds the upper limit thereof, chromatic aberration of magnification and astigmatism are not adequately corrected so that expected performance is not obtained. However, when conditional expression (5) is satisfied, it is easy to correct astigmatism, coma aberration, and chromatic aberration of magnification. This makes it possible to obtain expected performance.

Conditional expression (6) defines the range of the focal length of the fifth lens L5 with respect to the focal length of the entire image pickup lens system. If the value is below the lower limit of the conditional expression (6), the power of the fifth lens L5 is insufficient. This makes it difficult to decrease the optical length. If, on the contrary, the value exceeds the upper limit thereof, it is difficult to decrease the CRA, and the error sensitivity at low image height during manufacturing becomes severe. However, when conditional expression (6) is satisfied, the fifth lens L5 has a sufficient power, making it possible to reduce the optical length. This makes it easy to decrease the CRA so that the error sensitivity at low image height during manufacturing improves.

Conditional expression (7) defines the ratio between the focal length of the first lens L1 and the focal length of the third lens L3. If the value is below the lower limit of the conditional expression (7), the focal length of the third lens L3 is negative and too short. This makes it difficult to provide aberration correction. If, on the contrary, the value exceeds the upper limit thereof, the focal length of the third lens L3 is positive and too short. This impairs the balance of astigmatism and the balance of coma aberration, and the error sensitivity during manufacturing becomes severe. However, when conditional expression (7) is satisfied, it is easy to provide aberration correction. Further, it is possible to prevent the focal length of the third lens L3 from being too short, and to maintain an excellent astigmatism balance and coma aberration balance.

Conditional expression (8) defines the composite focal length of the second lens L2, the third lens L3, and the fourth lens L4. If the value is below the lower limit of the conditional expression (8), the negative power of the second lens L2 is too strong so that the error sensitivity during manufacturing becomes too severe, or the positive power of the fourth lens L4 is too weak so that it is difficult to correct astigmatism and distortion. However, when conditional expression (8) is satisfied, it is easy to correct astigmatism and distortion.

Conditional expression (9) defines the power relationship between the first lens L1, the second lens L2, and the third lens L3, that is, the focal length relationship. If the value is below the lower limit of the conditional expression (9), the negative power of the second lens L2 is too strong, so that the optical length becomes long, and the error sensitivity during manufacturing becomes severe. If, on the contrary, the value exceeds the upper limit thereof, the power of the third lens L3 is too strong so that it is difficult to obtain adequate off-axis performance. However, when conditional expression (9) is satisfied, it is possible to decrease the optical length and easily obtain adequate off-axis performance.

Conditional expression (10) defines the power relationship between the first lens L1, the third lens L3, and the fourth lens L4, that is, the focal length relationship. If the value is below the lower limit of the conditional expression (10), the power of the fourth lens L4 is too strong, so that the optical length becomes long, and it is difficult to correct astigmatism and distortion. If, on the contrary, the value exceeds the upper limit thereof, the power of the third lens L3 is too strong so that it is difficult to obtain adequate off-axis performance. However, when conditional expression (10) is satisfied, it is easy to correct astigmatism and distortion and obtain adequate off-axis performance.

Conditional expression (11) defines the power relationship between the first lens L1, the third lens L3, and the fifth lens L5, that is, the focal length relationship. If the value is below the lower limit of the conditional expression (11), the negative power of the fifth lens L5 is too strong. This makes it difficult to correct coma aberration and astigmatism. If, on the contrary, the value exceeds the upper limit thereof, the power of the third lens L3 is too strong so that it is difficult to obtain adequate off-axis performance. However, when conditional expression (11) is satisfied, it is easy to correct coma aberration and astigmatism and obtain adequate off-axis performance.

Conditional expression (12) defines the lens shape of the first lens L1. If the value is below the lower limit of the conditional expression (12), the optical length cannot be readily reduced. In addition, the error sensitivity during the manufacture of the first lens L1 becomes severe. If, on the contrary, the value exceeds the upper limit thereof, it is difficult to maintain a proper aberration balance so that expected performance is not obtained. However, when conditional expression (12) is satisfied, the optical length can be readily reduced. In addition, it is possible to maintain a proper aberration balance and obtain expected performance.

Conditional expression (13) defines the lens shape of the fourth lens L4. If the value is below the lower limit of the conditional expression (13), the power of the fourth lens L4 is too weak. Consequently, performance deterioration occurs because it is difficult to correct various aberrations. If, on the contrary, the value exceeds the upper limit thereof, the fourth lens L4 has an excessively strong power or has a small degree of meniscus curvature. In this instance, too, it is difficult to maintain a proper aberration balance so that expected performance is not obtained. However, when conditional expression (13) is satisfied, it is easy to correct various aberrations and maintain a proper aberration balance. As a result, expected performance is obtained.

Conditional expression (14) defines the optical length with respect to the focal length of the entire image pickup lens system. If the value is below the lower limit of the conditional expression (14), it is difficult to correct various aberrations due to an excessively decreased optical length. In addition, the error sensitivity during manufacturing becomes too severe. If, on the contrary, the value exceeds the upper limit thereof, it is difficult to reduce the thickness of the image pickup lens due to an excessively increased optical length. However, when conditional expression (14) is satisfied, it is easy to correct various aberrations. In addition, the thickness of the image pickup lens can be readily reduced because the optical length is not excessively short.

Conditional expression (15) defines the F-number (Fno), which is an indication of lens brightness. If the value is below the lower limit of the conditional expression (15), the F-number is excessively large so that requested brightness is not achieved in most cases. If, on the contrary, the value exceeds the upper limit thereof, the F-number is excessively small or the distance between the aperture stop (F-number luminous flux restriction plate) and the front surface of the first lens L1 is excessively long. In either case, expected optical performance is not obtained. However, when conditional expression (15) is satisfied, the expected optical performance can be obtained with ease.

Further, the second lens L2, the third lens L3, the fourth lens L4, and the fifth lens L5 are so-called plastic lenses that have at least one aspherical surface and are made of a resin material. Cost reduction can be achieved when at least the second lens L2, the third lens L3, the fourth lens L4, and the fifth lens L5 are made of an inexpensive resin material exhibiting high production efficiency.

Furthermore, as the aperture stop ST is positioned on the object side of the first lens L1 to decrease the CRA (Chief Ray Angle), it is easy to reduce the CRA (Chief Ray Angle) and obtain sufficient light amount at the periphery of the image plane at which light amount decreases.

Moreover, as the object side surface and image side surface of the fifth lens L5 have an aspherical shape that contains at least one inflection point from the center of the lens to the periphery thereof, it is possible to obtain adequate off-axis performance and CRA.

While the present invention has been described in terms of exemplary embodiments, it should be understood that the invention is not limited to those exemplary embodiments. Those skilled in the art will understand that various changes and modifications can be made within the scope and spirit of the invention.

The effects of the present invention are as follows.

The image pickup lens according to the present invention includes five lenses (the first to fifth lenses). Further, the third lens plays a role that is not found in a conventional four-lens configuration. Therefore, the present invention makes it possible to provide a high-performance, low-cost, compact lens in which various aberrations are properly corrected to support large-size, high-resolution image pickup elements having highly minute pixels.

What is claimed is:

1. An image pickup lens for a solid-state image pickup element, consisting of, in the order from an object side:
   a first lens, which has a convex surface facing the object side on an optical axis and has a positive refractive power;
   a second lens, which has a concave surface facing an image side on the optical axis and has a negative refractive power;
   a third lens, which has a negative refractive power and has aspheric surfaces on the object side and the image side;
   a fourth lens, which has a convex surface facing the image side on the optical axis, has a positive refractive power, and has a meniscus shape; and
   a fifth lens, which has a concave surface facing the image side on the optical axis, has a negative refractive power, and has a meniscus shape;

wherein the curvature radius of the fourth lens satisfies conditional expression (13) below:

$$1.4 < r7/r8 < 3.0 \tag{13}$$

where r7 is the curvature radius of the object-side surface of the fourth lens, and r8 is the curvature radius of the image-side surface of the fourth lens.

2. The image pickup lens according to claim 1, wherein the Abbe number of a material used for the first lens and the second lens satisfies conditional expressions (1) and (2) below:

$$45 < v1 < 90 \tag{1}$$

$$22 < v2 < 35 \tag{2}$$

where v1 is the Abbe number for d-line of the first lens, and v2 is the Abbe number for d-line of the second lens.

3. The image pickup lens according to claim 1, wherein the first lens, the second lens, the third lens, the fourth lens, and the fifth lens are so-called plastic lenses that have at least one aspherical surface and are made of a resin material.

4. The image pickup lens according to claim 1, wherein an aperture stop is positioned on the object side of the first lens.

5. The image pickup lens according to claim 1, wherein the object-side surface and the image-side surface of the fifth lens have an aspherical shape that contains at least one inflection point from the center of the lens to the periphery thereof.

6. The image pickup lens according to claim 1, wherein the first lens and the second lens satisfy conditional expressions (3) and (4) below:

$$0.5 < f1/f < 1.00 \tag{3}$$

$$-1.50 < f2/f < -0.65 \tag{4}$$

where f is the composite focal length of the entire image pickup lens system, f1 is the focal length of the first lens, and f2 is the focal length of the second lens.

7. The image pickup lens according to claim 1, wherein the fourth lens and the fifth lens satisfy conditional expressions (5) and (6) below:

$$0.9 < f4/f < 1.50 \tag{5}$$

$$-1.70 < f5/f < -0.85 \tag{6}$$

where f is the composite focal length of the entire image pickup lens system, f4 is the focal length of the fourth lens, and f5 is the focal length of the fifth lens.

8. The image pickup lens according to claim 1, wherein the second lens, the third lens, and the fourth lens satisfy conditional expression (8) below:

$$0.0 < f2 \cdot 3 \cdot 4 \tag{8}$$

where f2·3·4 is the composite focal length of the second, third, and fourth lenses.

9. The image pickup lens according to claim 1, wherein the first lens, the second lens, the third lens, the fourth lens, and the fifth lens satisfy conditional expressions (9), (10), and (11) below:

$$f1 < |f2| < |f3| \tag{9}$$

$$f1 < f4 < |f3| \tag{10}$$

$$f1 < |f5| < |f3| \tag{11}$$

where f1 is the focal length of the first lens, f2 is the focal length of the second lens, f3 is the focal length of the third lens, f4 is the focal length of the fourth lens, and f5 is the focal length of the fifth lens.

10. The image pickup lens according to claim 9, wherein the curvature radius of the first lens satisfies conditional expression (12) below:

$$-0.40 < r1/r2 < 0.10 \tag{12}$$

where r1 is the curvature radius of the object-side surface of the first lens, and r2 is the curvature radius of the image-side surface of the first lens.

11. The image pickup lens according to claim 9, wherein the optical length and focal length of the entire image pickup lens system satisfy conditional expression (14) below:

$$1.05 < L/f < 1.30 \tag{14}$$

where L is the distance from a front surface of the first lens to an image plane, and f is the composite focal length of the entire image pickup lens system.

12. The image pickup lens according to claim 4, wherein the diameter of the aperture stop satisfies conditional expression (15) below:

$$0.30 < CA1/f < 0.50 \tag{15}$$

where CA1 is the diameter of the aperture stop, and f is the composite focal length of the entire image pickup lens system.

13. The image pickup lens according to claim 9, wherein the Abbe number of a material used for the first lens and the second lens satisfies conditional expressions (1) and (2) below:

$$45 < v1 < 90 \tag{1}$$

$$22 < v2 < 35 \tag{2}$$

where v1 is the Abbe number for d-line of the first lens, and v2 is the Abbe number for d-line of the second lens.

14. The image pickup lens according to claim 9, wherein the first lens, the second lens, the third lens, the fourth lens, and the fifth lens are so-called plastic lenses that have at least one aspherical surface and are made of a resin material.

15. The image pickup lens according to claim 9, wherein an aperture stop is positioned on the object side of the first lens.

16. The image pickup lens according to claim 9, wherein the object-side surface and the image-side surface of the fifth lens have an aspherical shape that contains at least one inflection point from the center of the lens to the periphery thereof.

* * * * *